United States Patent [19]

Franklin

[11] Patent Number: 4,464,622

[45] Date of Patent: Aug. 7, 1984

[54] ELECTRONIC WALL STUD SENSOR

[76] Inventor: Robert C. Franklin, 914 Bicknell Rd., Los Gatos, Calif. 95030

[21] Appl. No.: 357,019

[22] Filed: Mar. 11, 1982

[51] Int. Cl.³ ............................................ G01R 19/00
[52] U.S. Cl. ..................................................... 324/67
[58] Field of Search ............... 307/592, 593, 594, 597, 307/296 R; 324/52, 67, 61 R

[56] References Cited

U.S. PATENT DOCUMENTS

| 4,099,118 | 7/1978 | Franklin | 324/61 R |
| 4,315,218 | 2/1982 | Rankin | 307/594 X |

FOREIGN PATENT DOCUMENTS

| 54-26483 | 2/1979 | Japan | 324/52 |
| 2045955 | 11/1980 | United Kingdom | 324/52 |

OTHER PUBLICATIONS

Maloney, "Locating Cable Faults"—*IEEE Transactions on Industry*, Applications—vol. IA-9, No. 4, Jul./Aug. 1973—pp. 392.
Dobkin, "OP AMP Circuit Collection", Application Note AN-31, National Semiconductors—Feb. 1970—pp. 6 & 17.

*Primary Examiner*—Stanley T. Krawczewicz
*Assistant Examiner*—Jose M. Solis
*Attorney, Agent, or Firm*—Alan H. MacPherson; Steven F. Caserza

[57] ABSTRACT

A portable device for locating a wall stud or similar object positioned behind a wall surface comprises means for detecting a change in the dielectric constant of the wall due to the presence of a stud or similar object and, in combination therewith, means for detecting the presence in the wall of a source of alternating current. In addition, a display is provided for visually indicating the presence of a source of alternating current in the wall in response to a signal from the means for detecting. The circuit also includes an amplifier to compensate for variations in characteristics of the electrical components used in the structure and an improved circuit for bleeding a bias charge used to calibrate the device when the device is shut off while preventing this charge from being bled when the device is turned on, and structure for indicating to the user that the device is being calibrated.

5 Claims, 7 Drawing Figures 4,464,622

ELECTRONIC WALL STUD SENSOR

BACKGROUND OF THE INVENTION

1. Field of the Invention

This invention relates to a sensor and in particular to a sensor suitable for detecting the location of wooden studs in walls and similar type structures.

2. Prior Art

U.S. Pat. No. 4,099,118 issued July 4, 1978 discloses an electronic wall stud sensor which is particularly suitable for locating a wall stud positioned behind a wall surface. The sensor detects the stud by measuring a change in the capacitance of the wall due to the presence of a stud movement of the sensor along the wall surface. The sensor comprises a capacitor plate mounted in the sensor close to the wall surface, a circuit for detecting any change in the capacitance of the capacitor plate due to a change in the dielectric constant of the wall caused by the location of a stud positioned behind the wall surface and immediately adjacent the capacitor, and means for indicating the change in capacitance of the capacitor plate, thereby to indicate the wall stud position.

While the above described electronic wall stud sensor works as described to locate studs in walls, experience has shown that its performance could be improved in several respects. In the manufacture of the circuits used in the electronic wall stud sensor, variations in circuit sensitivities result due to tolerances on the characteristics of integrated circuits. The result has been a significant and objectionable variation in the performance characteristics of the sensor. Furthermore, it has been found desirable for the operator to recognize when the circuit is automatically calibrating itself. In addition, discharging a calibration capacitor used in the circuit when the power switch is turned off has been deemed necessary. It has also been found important to be able to distinguish between a wall stud or a wire or wires carrying alternating current.

SUMMARY

In accordance with this invention, an improved electric wall stud sensor is provided which has means for compensating for variations in circuit sensitivities as a result of integrated circuit tolerances, which also has means for informing an operator of the sensor when the automatic calibration function in the circuit is operating, which has means for discharging the calibration voltage storage capacitor when the power switch is turned off thereby to allow the use of inexpensive components and which provides a means for indicating when the wall stud sensor is positioned in proximity to a wire or wires carrying an alternating current.

DESCRIPTION

Figure 1:
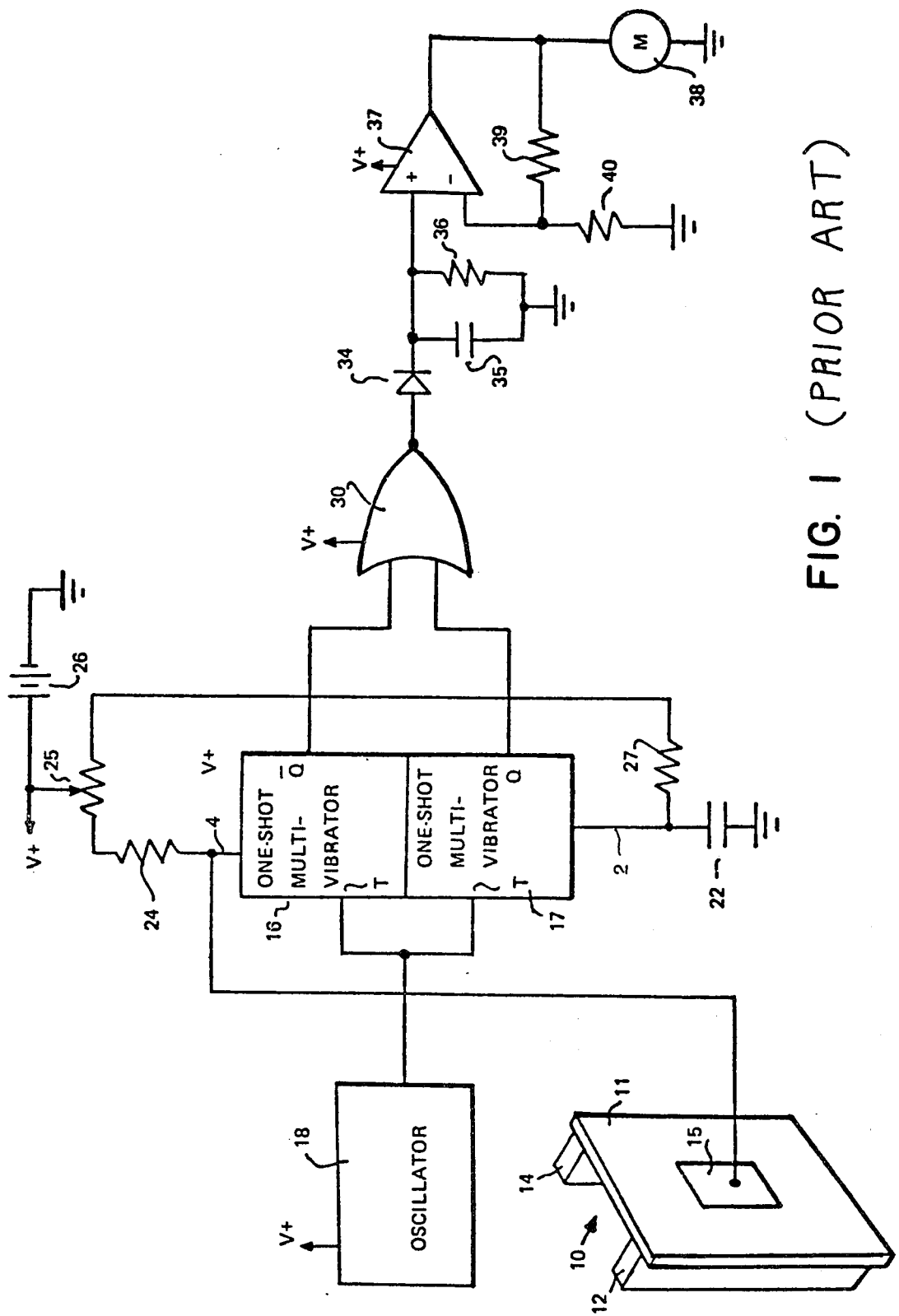
FIG. 1 is a schematic of a prior art wall stud sensor of the invention.

Shown in FIG. 1 is a portion 10 of a wall structure comprising a wall covering 11 which can be made of a material such as sheetrock. Naturally when such a wall covering is placed in position, it is nailed or otherwise fixed to the wall studs 12 and 14. Ordinarily with such a wall, the nail heads are covered over or dressed such that they cannot be detected by observation of the wall surface. Thus, when one has need to locate a wall stud for the hanging of pictures or the like, observation of the wall is not sufficient and there exists the need for a good method of detecting the actual position of the wall studs. At the same time, it is important not to confuse an electrical power line with a wall stud.

Figure 2:
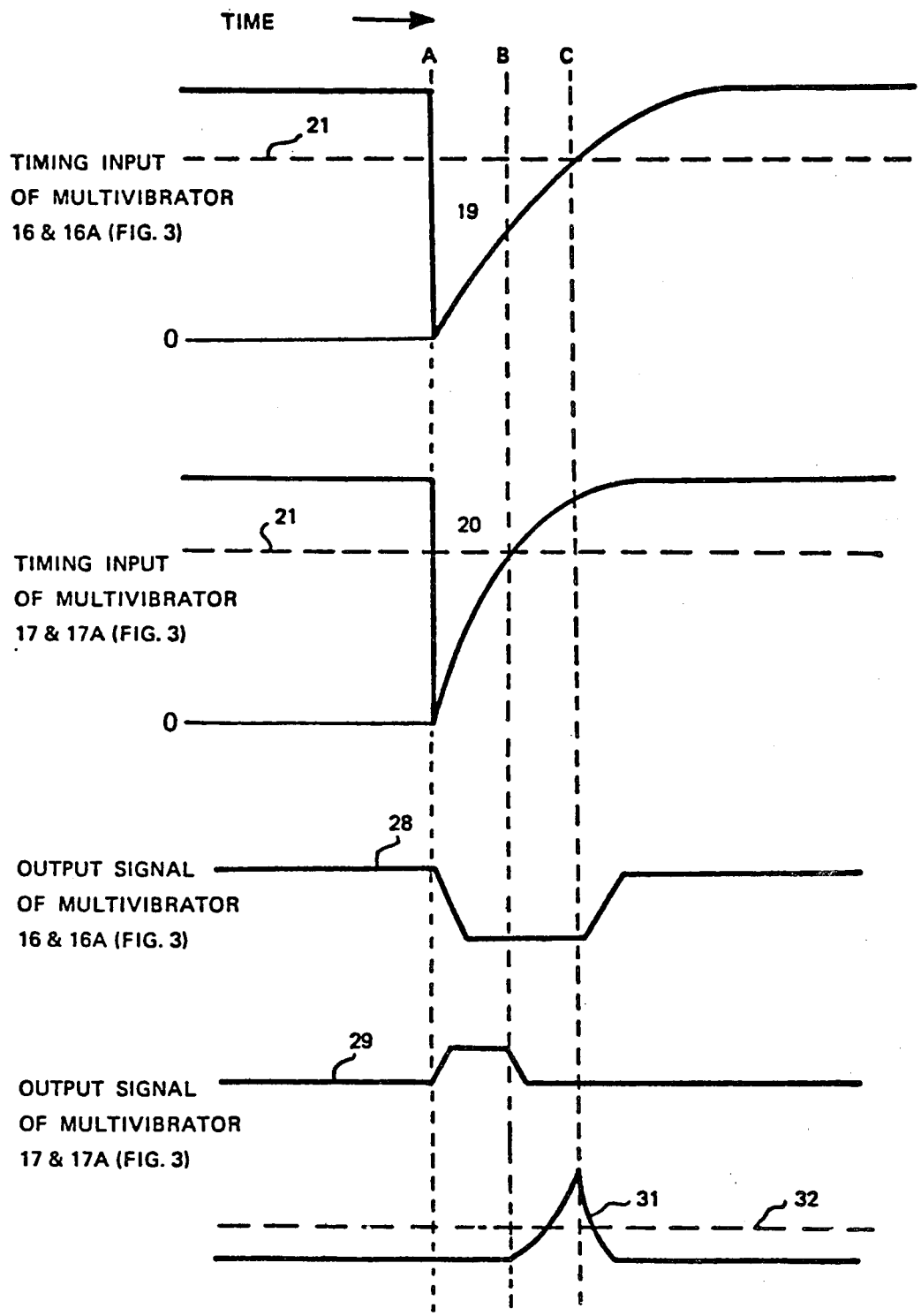
FIG. 2 shows various waveforms of the circuit of FIG. 1 and FIG. 3.

In accordance with the present invention there is provided a portable sensor for accurately locating the positions of the wall studs in the wall. The circuit diagram of one prior art wall stud sensor is shown in FIG. 1. The overall object of the stud finder is to sense variations in the dielectric constant of a wall as caused by the presence of a wall stud. As shown in FIG. 1, the circuit includes a sensor plate or capacitance plate 15 which can be moved along a wall such as that shown and which connects to one terminal of a first one-shot multivibrator 16. A second one-shot multivibrator 17 is also provided with an oscillator 18 connected to provide a signal for triggering both multivibrators simultaneously at a constant rate. Thus, as shown in FIG. 2, the multivibrators will turn on to conduct at time A as indicated by the waveforms 19 and 20 with the waveform 19 indicating the timing input signal of the multivibrator 16 and the waveform 20 indicating the timing input signal of the multivibrator 17. One type of multivibrator suitable for use in the circuit of FIG. 1 is CMOS MC 14528 manufactured by Motorola, Inc.

At the time the multivibrators are triggered, the waveforms 19 and 20 drop to their zero levels and thereafter the waveforms rise exponentially in a positive direction towards a threshold level 21. The rate at which the input signals to the multivibrators rise is determined by the relative sizes of the capacitance of plate 15 positioned close to wall 10 and of fixed capacitor 22 connected to terminal 2 of the multivibrator 17. Plate 15 is connected to terminal 14 of the multivibrator 16 and forms with the resistor 24 and the potentiometer 25 connected to a source of voltage such as the battery 26, the time constant determining circuit of multivibrator 16. Similarly, the capacitor 22 and the resistor 27 in combination with the potentiometer 25 determine the time constant for the multivibrator 17. Once potentiometer 25 is set the time constant of the multivibrator 17 is constant since the capacitor 22 is constant. However, because the capacitance of the plate 15 can vary as the wall dielectric constant varies, the time constant for the multivibrator 16 can change.

Thus, as shown in FIG. 2 for instance, there can be caused a time difference between the termination of the output signal 28 of multivibrator 16 and the output signal 29 of multivibrator 17. The magnitude of this time difference is controlled by the time the waveforms 19 and 20 respectively reach a threshold voltage indicated by the dotted line 21. If the capacitance associated with sensor plate 15 increases relative to the capacitance of capacitor 22, then at the time the threshold voltage level 21 is reached by each multivibrator input timing signal 19 and 20, the output signal 28 of the multivibrator 16 will be at a zero level while the output signal 29 of the multivitrator 17 will be at a positive level. However, at the time period B when the timing input 20 to the multivibrator 17 reaches the threshold level 21, the output signal 29 of the multivibrator will reduce to zero. Thereafter, when the timing input signal 19 to multivibrator 16 reaches the threshold level 21, the output signal 28 from multivibrator 16 goes positive.

For detection of changes in the time constants of the multivibrator output signals 28 and 29, these output signals are fed to the respective terminals of a NOR gate 30. During the time that the output signals 28 and 29 from the multivibrators are both below the logic switching level of the NOR gate; i.e., the time difference between the level changes of the multivibrator input signals 19 and 20, NOR gate 30 will produce an output pulse 31. The peak of the waveform 31 extending above the level 32 which represents the threshold voltage of the diode 34 is thus supplied for charging a capacitor 35. Capacitor 35 is connected in parallel with a resistor 36 which is relatively high resistance to allow the charge on capacitor 35 to dissipate slowly.

An operational amplifier 37 is connected in a non-inverting configuration and receives as an input signal at its positive terminal the voltage corresponding to the charge on the capacitor 35. Amplifier 37 supplies an amplified voltage output signal to a meter 38. The circuit of resistors 39 and 40 is provided to energize the other terminal of the operational amplifier and to determine the voltage gain of the circuit.

Thus, the meter 38 indicates the charge on the capacitor 35 which in turn reflects the difference in the time of reaching the threshold voltage for the output signals 28 and 29 of the multivibrators 16 and 17. Since this time period is based upon the relative charges on the capacitors 15 and 22 and since the charge on capacitor 15 changes as the dielectric constant of the wall changes, there is indicated by the meter reading the proximity of the capacitor plate 15 to a stud within the wall 10. That is, so long as the plate 15 is adjacent the wallboard between the studs, the capacitance of the plate 15 remains substantially constant and the meter reading remains the same. However, as the plate 15 is moved into proximity with a stud, the capacitive value of the plate 15 changes thereby changing the time constant of the multivibrator 16 resulting in a higher reading on the meter 38 because of the growing difference between the termination of the output signals 28 and 29 of the multivibrators 16 and 17.

To use the sensor shown schematically in FIG. 1, the plate 15 is placed adjacent the wall in which the stud is being located. Thereafter, the potentiometer 25 is adjusted until waveform 32 is very slightly positive, that is, until there is a very slight indication of the transmission of a signal 31 above the conduction level of the diode 34 as shown by a low meter reading on the meter 38. Thereafter, movement of the sensor along the wall and into close proximity with one of the studs 12 or 14 in the wall will cause the value of the capacitance associated with the plate 15 to rise resulting in a difference in conduction time between the multivibrators as indicated by the meter 38. The output signal received by the meter is shown as waveform 41 shown in FIG. 4. If by chance the meter is placed directly over a wall stud at the time calibration of the potentiometer is accomplished, movement of the sensor will not cause a rise in the meter reading but instead a falling thereof thus indicating that recalibration of the sensor at a different spot on the wall is appropriate prior to further operation to locate a stud.

Figure 3:
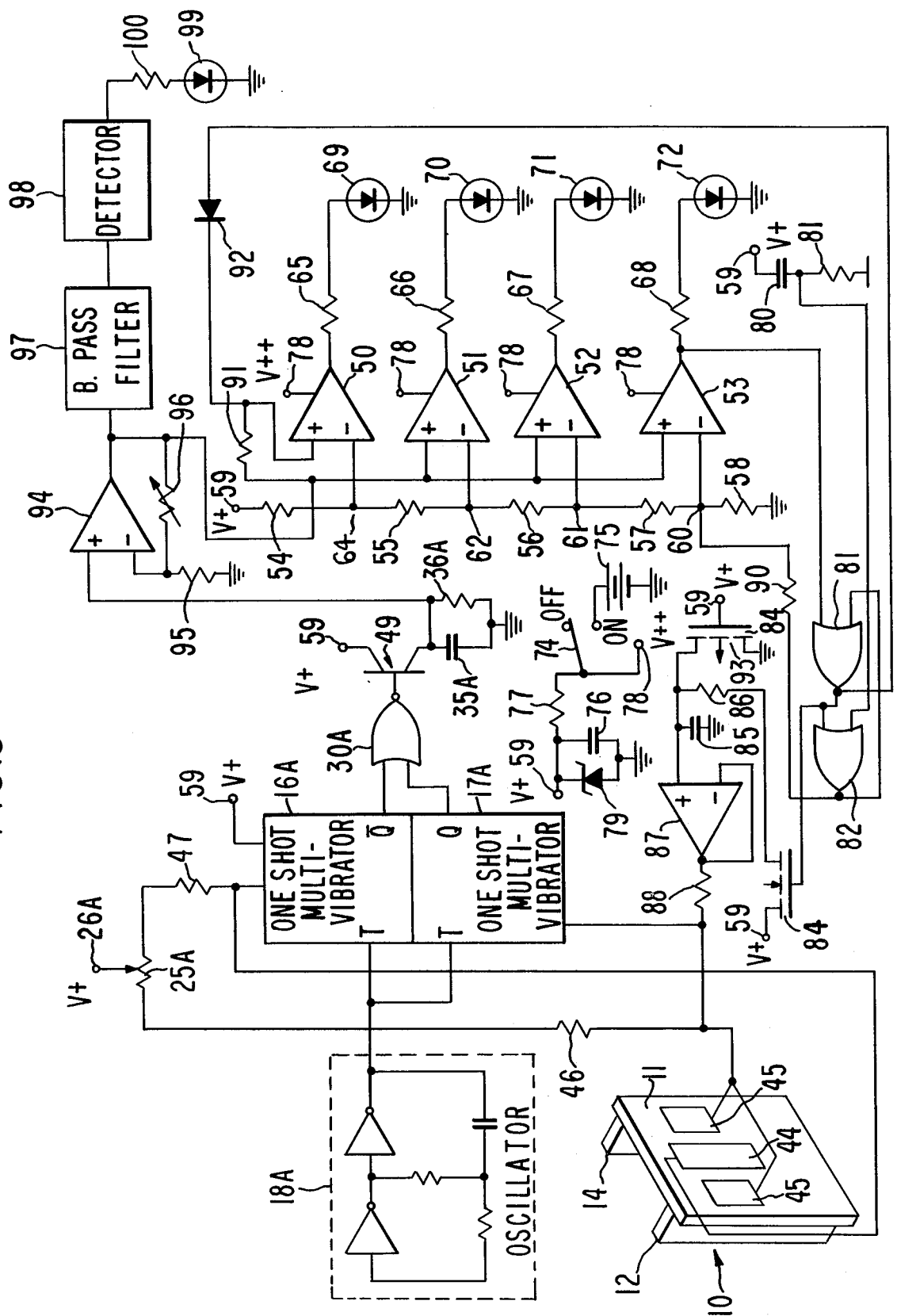
FIG. 3 shows an embodiment of the invention in schematic form.

Shown in FIG. 3 is an embodiment of the invention for use in locating the positions of the studs 12 and 14 in the wall 10 behind the wallboard 11. A pair of one-shot multivibrators 16A and 17A are provided which function in the same manner as described in the previous embodiment. An oscillator 18A is provided for triggering these multivibrators. A potentiometer 25A connected to a voltage source V+ at terminal 26A is utilized to power the circuit.

As in the prior art, operation of this circuit also detects the change in capacitance of the plates as they are moved along a wall 10 and into proximity with a wall stud 12 or 14. However, in accordance with one feature of this invention, there is provided a plurality of capacitor plates to improve the response to the change in the dielectric constant of the wall. Accordingly, plate 44 is positioned between a pair of coupled plates 45. Plates 45 are smaller in total area than the plate 44. In the circuit of FIG. 3 the time duration of the waveform 19 of FIG. 2, which also is the timing input signal of the multivibrator 16A, is dependent upon the capacitance of sensor plate 44, the resistance 47 and the setting of the potentiometer 25A. Similarly, the time duration of the waveform 20, which is the timing input signal to multivibrator 17A, is dependent upon the capacitance of the plate 45, the value of the resistor 46 and the setting of the potentiometer 25A. Thus, as the sensor is moved across the wall, the capacitance 45 first reaches a stud following thereafter by the plate 44 and subsequently the other plate 45. As a result, the output signal of the multivibrator 17A will change first caused by an increase in the capacitance on the plates 45 because of the fact that one plate has reached a position in proximity to a stud while the plate 44 and other plate 45 have not. With further movement of the sensor to center the plate 44 over a stud and because the plate 44 is larger than the combination of the plates 45, there will be created a pulse width time difference as indicated by the waveforms 28 and 29 of FIG. 2. There will result an output signal 31 conducted through the NOR gate 30A which produces a positive output signal when both input signals 28 and 29 to NOR gate 30A are simultaneously below the switching threshold of gate 30A.

Figure 4:
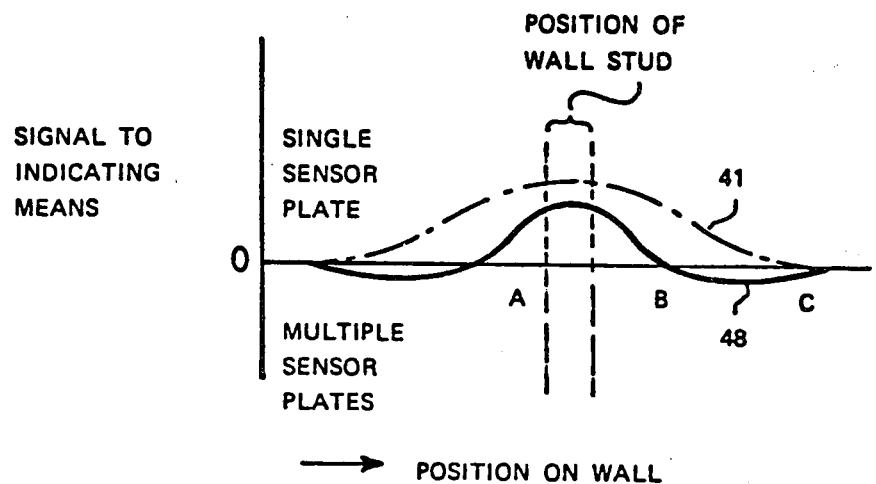
FIG. 4 shows the waveforms of the signals generated by the change in the charge on the capacitors of the circuits of FIGS. 1 snd 3 caused by a change in the di-electric constant of the wall.

As shown in FIG. 4, the waveform 48 indicates the output from this circuit wherein as the leading plate 45 approaches the stud there is generated the output signal from the NOR gate 30A corresponding to the movement of the sensor position from zero to A. As the plate 44 reaches the stud position A to B, the multivibrator 16A has a longer time constant. Thereafter as the sensor is moved further, the trailing plate 45 comes over the stud from the period B to C. Thus as can be seen by use of the multiple capacitor plates in the two multivibrator circuits, a more distinct or sharp waveform is obtained for detecting the difference in the capacitance of the multivibrator circuits caused by the presence of the wall stud.

In accordance with another feature of this invention, there is provided a visual digital readout means as shown in FIG. 3. For this purpose the waveform 32 is applied to the base of the transistor 49 connected as an emitter follower. The positive excursion of the waveform 48 causes an increased collector to emitter current through the transistor to charge the capacitor 35A. When the waveform 31 decreases from its peak value the voltage on the capacitor is prevented from discharging back through the emitter of the transistor 49 because of the reverse bias condition on the transistor. Thus, the voltage on the capacitor 35A can only slowly discharge through the very large resistor 36A. A plurality of operational amplifiers 50, 51, 52 and 53 are connected to receive at their positive terminals a voltage signal indicative of the charge on the capacitor 35A. These amplifiers are biased at the negative terminals by a resistive voltage divider consisting of the resistors 54, 55, 56, 57 and 58 connected between ground and a terminal 59 connected to the voltage V+. Thus the voltage levels at the terminals 60, 61, 62 and 64 are progressively more positive. With the voltage on the capacitor 35A equal to zero the output signals from the amplifiers 50, 51, 52 and 53 are no greater than zero volts. However, as the voltage on the capacitor 35A is increased and because of the fact that the terminal 60 is at the lowest voltage, the amplifier 53 will first become conductive. As the voltage rises further on capacitor 35A, amplifiers 52, 51 and 50 will initiate conduction in consecutive order. Conduction through amplifiers 50, 51, 52 and 53 is indicated by current flow through the associated resistors 65, 66, 67 and 68, respectively, to the light emitting diodes 69, 70, 71 and 72, respectively. Thus as the voltage on capacitor 35A increases, these lightemitting diodes will initiate light emission with the highest voltage on capacitor 35A being indicated when all light emitting diodes are emitting light.

Thus, as the sensor is placed against the wall with the sensing plates 44 and 45 adjacent the wall surface and moved therealong and a stud is approached, the first LED 72 will light. As the sensor is moved closer to the stud, subsequent LEDs 71 and 70 will light. When all four LEDs are lit, or at least a maximum number of LEDs are lit, it is an indication that the sensor is positioned directly over the stud. However, to assure this fact, continued movement of the sensor in the same direction will first cause the LED 69, or the topmost LED, to stop light emission followed subsequently by the LEDs 70, 71 and 72 in that order. Thus the sensor can be shifted back and forth across this position to obtain a close idea of the exact center of the stud; i.e., the area between the positions at which the LED 69 goes out as the sensor is moved in each direction.

In accordance with another feature of the invention, the sensor is self-calibrating. That is the charge on capacitor 35A is automatically set to a value just below that charge necessary to generate a voltage across capacitor 35A sufficient to initiate light emission from LED 72 because of conduction through the amplifier 53. For this purpose there is provided the circuit including the on-off switch 74 connected to the battery 75 which serves as the main power source for the sensor.

Power switch 74 is a single pole-single throw switch. This switch is used in conjunction with P-channel MOS transistor 93 to discharge capacitor 85 when switch 74 is in the OFF position. Normally on P-channel MOS device 93 is connected across capacitor 85 with its gate terminal connected to the positive supply V+ 59. When switch 74 is ON the gate of MOS device 93 is at the V+ potential, placing the device in its non-conducting state thus allowing any charge accumulated on capacitor 85 during the calibration sequence to be maintained with minimal loss. When switch 74 is OFF the gate voltage of MOS device 93 drops to zero thereby biasing device 93 in a conductive state, allowing a discharge of any voltage on capacitor 85. Thus prior to turning the switch 74 to ON position, i.e., the switch is in the OFF position, calibration capacitor 85 is connected to ground. In the prior embodiment described in U.S. Pat. No. 4,099,118, capacitor 85 was discharged through double pole switch 74 in the OFF position, thereby necessitating use of a more expensive switch than desired.

To calibrate the sensor, it is placed against the wall surface in which the studs are to be located and the switch 74 is turned to the ON position. In this position the battery 75 is connected through the switch to energize the operational amplifiers 50, 51, 52 and 53 through the common terminal 78 carrying voltage V++. In addition the voltage regulator circuit including the capacitor 76, the resistor 77 and the Zener diode 79 is energized to provide the V+ to the terminals 59 and 26A.

With the turning of the switch 74 to the ON position, there results a rapid increase in voltage at the terminal 59 causing a buildup in the voltage on the capacitor 80. The differentiated voltage waveform which results at the resistor 81 is applied to a terminal of the NOR gate 82 which in conjunction with the NOR gate 81 forms a bistable latch circuit. This bi-stable latch circuit will initially latch into a condition which the output signal of the NOR gate 82 is zero volts and the output signal of the NOR gate 81 is positive. The latter voltage is applied to the gate terminal of the field effect transistor 84 causing it to transmit current for charging the calibration capacitor 85 by current flow through the resistor 86. The amplifier 87 has a high input impedance and is connected in a voltage follower configuration. Therefore, any voltage appearing on the calibration capacitor 85 will appear as the output signal of the amplifier 87.

Initially, with the output signal of the amplifier 87 being at zero volts, the waveforms 28 and 29 (FIG. 2) are substantially identical in width thereby producing no peak amplitude of the waveform 21. As the voltage on the calibration capacitor 85 and hence the output voltage of the amplifier 87 increases, the small current through the resistor 88 increases. This results in an increased charging current of the sensor plate capacitance 45 accompanied by a reduction in the pulse width of the waveform 29. As the width of the waveform 29 decreases, the peak amplitude of the waveform 31 increases which in turn increases the voltage on the capacitance 35A. Thus the calibration capacitor 85 continues to charge until the voltage on the calibration capacitor 35A reaches the threshold voltage of the amplifier 53. At this time the output of the amplifier 53 becomes positive and the LED 72 lights.

At the time the amplifier 53 becomes conductive it not only causes the LED 72 to light but also applies an input signal to the NOR gate 81 which causes the bi-stable circuit comprising gates 81 and 82 to latch in a condition where the output of the NOR gate 81 is zero and the output of the NOR gate 82 is positive. The zero output of the NOR gate 81 switches off the transistor 84 thereby trapping the charge on the calibration capacitor 85 at a level that will be held for several minutes before dicharging through the connected high impedance circuits. The positive output voltage of the NOR gate 82 is applied to the resistor 90 resulting in a current flow which increases the effective threshold voltages at the negative terminals of the amplifiers 50, 51, 52 and 53.

The increase in the value of this voltage causes the output signal from the amplifier 53 to return to zero thereby extinguishing the LED 72. Thus, the calibration sequence takes only a short period of time (in order of a few seconds) and is acknowledged by a short term lighting of the LED 72.

Under some circumstances, LED 72 may be lit for such a short time period that the operator is unable to detect it. To give immediate feedback to the operator to indicate that the sensor is indeed operational when the power switch is first actuated, resistor 91 and diode 92 are provided. As can be seen in FIG. 3, resistor 91 is inserted between the non-inverting input of amplifier 50 and the output of amplifier 94. The function of amplifier 94 will be described shortly. Diode 92 is connected between the non-inverting input of amplifier 50 and the output of NOR gate 81. As previously described, the output of NOR gate 81 is initially positive when the power switch 74 is first actuated. The application of this positive voltage through diode 91 to the non-inverting input lead to amplifier 50 will cause the output signal of amplifier 50 to become positive, thus turning on LED 69. Resistor 91 acts as an isolating impedance between the amplifier 50 input lead and the output lead of amplifier 94. LED 69 will conduct until the calibration sequence is complete, at which time the output of NOR gate 81 will drop to zero, removing the positive voltage from the non-inverting input lead to amplifier 50 thus turnig off LED 69. In this manner, the initial lighting of LED 69 not only tells the operator that the sensor circuits have been activated by the closing of switch 74, but likewise provides a means of indicating that the calibration sequence is in progress and that movement of the sensor across the wall surface before calibration is complete could result in erroneous readings.

Moving the sensor along the wall in the manner previously described will thus cause the LED 72, 71, 70 and 69 to light in that order as a stud is detected. However, in the rare occurrence where the sensor has been placed directly over a stud when the switch 74 is turned on, these LEDs will not come on and recalibration of the sensor is necessary. This is accomplished by first turning off the switch 74 which causes the calibration capacitor 85 to discharge in a manner described above. Thereafter by placing the sensor at another position on the wall surface, the switch 74 can be turned on and the calibration sequence will follow automatically.

Because of variations in switching speeds of the dual one-shot multivibrators 16A and 17A and NOR gate 30A, the transfer characteristics of the circuit of FIG. 3 as disclosed in the '118 patent often varied thus causing excessive variations in the sensitivity of the circuit of that FIG. 3 and hence of its ability to detect the presence of wall studs. The transfer function of the circuit of FIG. 3 is defined as the change in peak voltage output from NOR gate 30A for a given change in the capacitance at plates 44 and 45. To improve the circuit performance a non-inverting amplifier 94 is added as shown in FIG. 3 between the output of emitter follower transistor 49 and the common inputs to amplifiers 50,51,52 and 53. The gain of the amplifier circuit is determined by the values of resistors 95 and 96, with resistor 96 being made variable so that the circuit gain can be set by the user or at the factory to a value necessary for optimum performance.

When using the wall stud sensor, it is advantageous from the standpoint of safety to know of the presence of a power line behind the wall surface to possibly prevent driving a nail or other fastener into such a power conductor. The presence of a power line causes a modulation of the width of the output pulses from the one-shot multivibrators 16A and 17A and, hence, causes a modulation of the amplitude of the output signal from emitter follower 49 and amplifier 94. By monitoring the output signal of amplifier 94 with a bandpass filter circuit 97 and detector 98, LED 99 is turned on when this output signal contains a line frequency component of sufficient amplitude to indicate the presence of a power line. The bandpass filter 97 and detector 98 are shown in generalized block form in FIG. 3.

Figure 6:
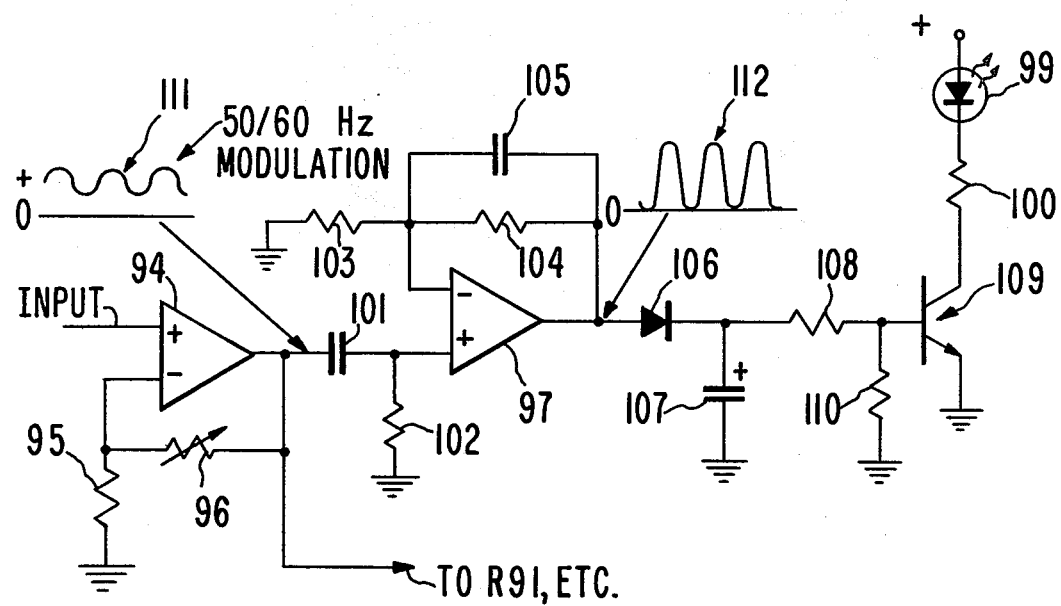
FIG. 6 shows a bandpass filter circuit suitable for use with this invention to detect the presence of an alternating current power line.

FIG. 6 shows bandpass filter 97 and detector 98 in more detail.

As previously mentioned, the presence of an A.C. power line causes the width of the two pulses from one-shot multivibrators 16A and 17A to be modulated by the electromagnetic field which is intercepted by the sensing plates 44 and 45. This modulation causes the amplitude of the output pulse from NOR gate 30A to also vary at the frequency of the A.C. power line. The net effect is to produce a modulation of the output of amplifier 94. The bandpass filter amplifier 97 provides a means for selecting and amplifying only a band of frequencies which include those of the A.C. power line (typically 50 to 60 Hz). The output signal from amplifier 94 (waveform 111 in FIG. 6) is applied to capacitor 101 and resistor 102 which comprise a first order high-pass filter. This high-pass filter attenuates frequencies below approximately 30 Hz. Non-inverting amplifier 97 amplifies those frequencies above 30 Hz but less than 350 Hz. The amplifier gain is normally determined by resistors 103 and 104 but the addition of capacitor 105 across resistor 104 acts as a shunt impedance at higher frequencies (approximately 350 Hz) which reduces the effective amplifier gain. Thus, the combination of the high-pass filter and the high-frequency attenuation form a bandpass filter which amplifies only those frequencies of interest.

Waveform 112 represents the amplified modulating power line frequency. Capacitor 107 will charge to the peak of waveform 112, minus the drop across diode 106. The voltage on capacitor 107 will produce a forward bias current to the base of transistor 109 via resistor 108. This forward bias drives transistor 109 into conduction which, in turn, causes current to flow through LED 99 and current-limiting resistor 100. Resistor 110 is a base bias resistor.

Thus, the use of an active bandpass filter and detector circuit allows the presence of a non-shielded power line behind a wall surface to be indicated to te operator by means of an LED.

Figure 5A:
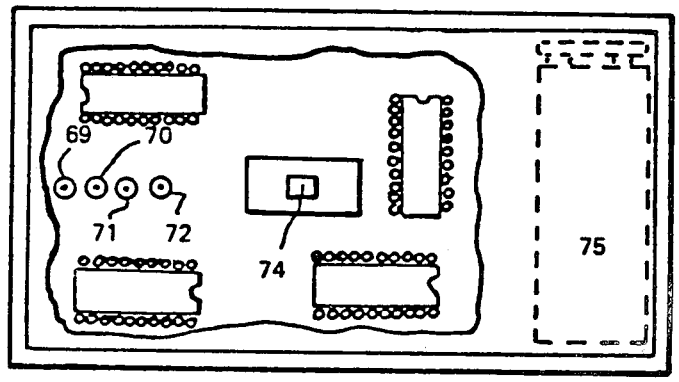
FIGS. 5A and 5B show the invention embodied in a housing.
Figure 5B:
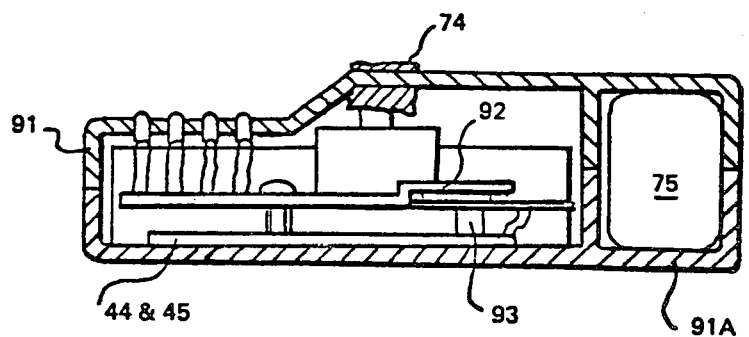

FIGS. 5A and 5B are views of one embodiment of the sensor with the circuit components placed in the housing 91. As can be seen there is provided the switch 74 having the ON and OFF positions. LEDs 69,70,71 and 72 are positioned to be viewed from the top of the case with the plates 44 and 45 being placed side-by-side along the bottom surface 91A of the case. The battery 75 provides the power. The circuits are included on a circuitboard 92 supported on the support posts 93 within the case. Thus it can be seen that the sensor is packaged in a case which is approximately the size of a cigarette package for easy portability and is lightweight for ease of handling and movement across the wall surface for the location of the stud positions.

While several embodiments of the above invention have been described, it should be understood that this description is by way of example only and is not intended to limit the scope of the invention. Other embodiments of this invention will be obvious to those skilled in the art in view of the above disclosure.

I claim:

1. A portable device for locating a wall stud positioned behind a wall surface comprising:
   a first capacitor plate;
   a pair of second capacitor plates located one on each side of said first capacitor plate and in substantially the same plane as said first capacitor plate;
   means for conducting a charge to said first capacitor plate;
   means for conducting a charge to said pair of second capacitor plates;
   means for producing an intermediate output signal representative of the change in the relative capacitance between said first capacitor plate and said pair of second capacitor plates in response to said first capacitor plate and said pair of second capacitor plates being moved along said wall surface;
   means, responsive to said intermediate output signal, for adjusting the amplitude of said intermediate signal to compensate for variations in the characteristics of said means for producing;
   means, responsive to said intermediate output signal, for displaying any change in relative capacitance between said first capacitor plate and said pair of second capacitor plates;
   means for automatically calibrating said device including:
      means for supplying a calibration charging current to said pair of second capacitor plates;
      means for detecting when said intermediate output signal caused by said calibration charging current exceeds a selected threshold value;
      means for holding said calibration charging current constant when said intermediate output signal reaches said threshold value;
   means for indicating that said calibration charging current is increasing during the calibration of said device;
   means for resetting said means for supplying said calibration charging current comprising a normally on MOS device which provides a low impedance current path to reset said means for supplying a calibration charging current when said device is shut off and which provides a high impedance path to prevent the resetting of said means for supplying when said device is turned on;
   means, responsive to said intermediate output signal, for detecting the presence of a line carrying alternating current behind the surface of said wall comprising:
      bandpass filter means for rejecting those components of said intermediate output signal not in the range of frequency of said alternating current and for amplifying those components of said intermediate output signal in the range of frequency of said alternating current;
      means for rectifying the signal amplified by said bandpass filter means so that the presence of said line carrying alternating current is detected when said rectified signal exceeds a selected value; and
   means for indicating that the presence of a line carrying alternating current is being detected by said means for detecting.

2. A Device as in claim 1 wherein said means for rectifying comprises a diode and a capacitor, the anode of said diode being connected to said means for amplifying and the cathode of said diode being connected to one plate of said capacitor, the other plate of said capacitor being grounded; and wherein said device includes
   means for indicating that the charge on said capacitor exceeds a selected value.

3. A Device as in claim 2 wherein said means for indicating comprises:
   light means; and
   means for switching on said light means in response to the charge on said capacitor exceeding a selected value.

4. A Device as in claim 3 wherein said means for switching comprises a transistor connected in operative relationship with said light means, said transistor being turned on by the charge on said capacitor producing a voltage across said capacitor which exceeds the base to emitter forward bias voltage of said transistor, thereby to turn on said light means.

5. A Device as in claim 1 wherein said means for indicating that said calibration charging current is increasing during the calibration of said device comprises:
   a bistable circuit for producing a high output signal on a first lead and a low output signal on a second lead during the time that said means for conducting a charge to said pair of second capacitor plates is conducting said calibration charging current;
   means responsive to the high output signal on said first lead during the time said device is being calibrated to produce a signal from an indicating means during the time said structure is being calibrated, and
   means responsive to the calibration of said device for changing the state of said bistable circuit thereby to produce a low output signal on said first lead and a high output signal on said second lead thereby to terminate the signal from said indicating means coincidentally with the termination of said calibration.

* * * * *